United States Patent [19]

Inana et al.

[11] Patent Number: 5,128,770
[45] Date of Patent: Jul. 7, 1992

[54] VIDEO CAMERA

[75] Inventors: Katsuya Inana; Kenichi Hoshi; Yoshiaki Nakayama, all of Tokyo, Japan

[73] Assignee: Fuji Photo Film Co., Ltd., Kanagawa, Japan

[21] Appl. No.: 660,987

[22] Filed: Feb. 27, 1991

Related U.S. Application Data

[63] Continuation of Ser. No. 326,833, Mar. 21, 1989.

[30] Foreign Application Priority Data

Mar. 25, 1988 [JP] Japan ................................. 63-69235
Apr. 7, 1988 [JP] Japan ................................. 63-86862

[51] Int. Cl.⁵ ........................ H04N 5/30; G03B 17/00
[52] U.S. Cl. .................................. 358/229; 358/210; 354/293
[58] Field of Search ............... 358/229, 210; 354/81, 354/293; 455/603

[56] References Cited

U.S. PATENT DOCUMENTS

| | | | |
|---|---|---|---|
| 3,164,838 | 1/1965 | Heinrich | 358/210 |
| 4,566,036 | 1/1986 | Kadosawa | 358/210 |
| 4,655,567 | 4/1987 | Morley | 354/81 |
| 4,716,465 | 12/1987 | Meyer | 358/210 |
| 4,720,805 | 1/1988 | Vye | 358/229 |
| 4,731,669 | 3/1988 | Hayashi et al. | 358/229 |
| 4,746,944 | 5/1988 | Heisinger | 354/293 |
| 4,795,118 | 1/1989 | Kosugi et al. | 354/293 |

FOREIGN PATENT DOCUMENTS 3308126 9/1984 Fed. Rep. of Germany ...... 358/210

Primary Examiner—David K. Moore
Assistant Examiner—Wendy R. Greening
Attorney, Agent, or Firm—Sughrue, Mion, Zinn, Macpeak & Seas

[57] ABSTRACT

A video camera is disclosed in which a drive device for at least swinging or tilting a main body of the video camera is disposed within the video camera main body or within a grip arranged in the lower portion of the video camera main body.

16 Claims, 8 Drawing Sheets

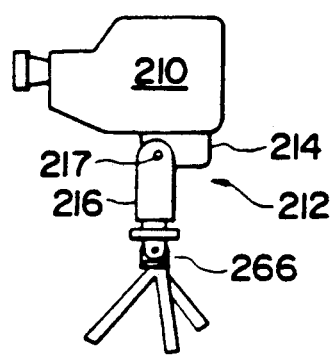
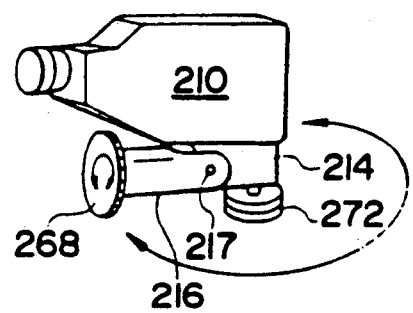
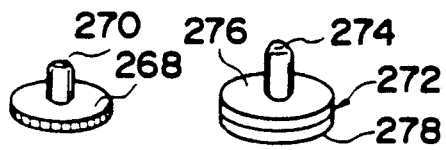
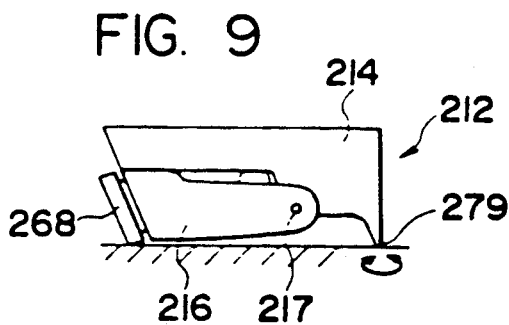
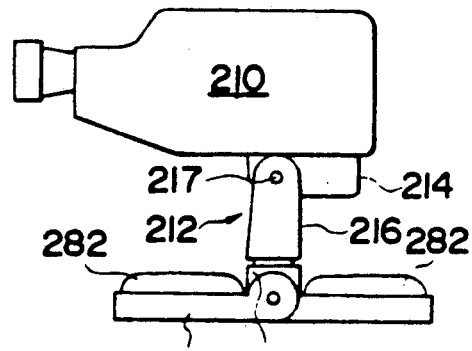
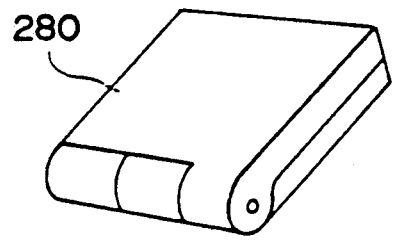
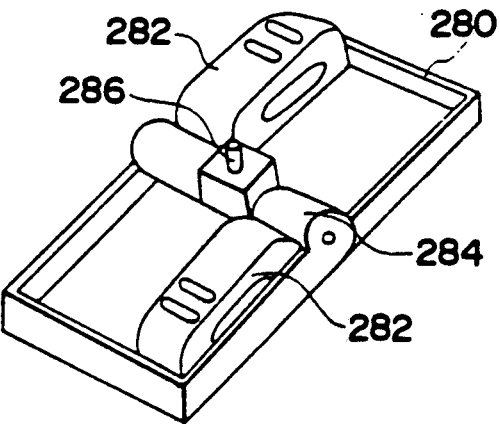

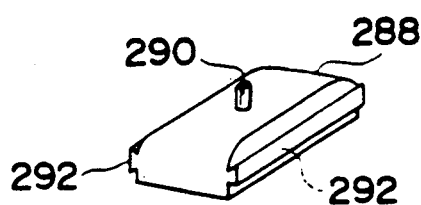
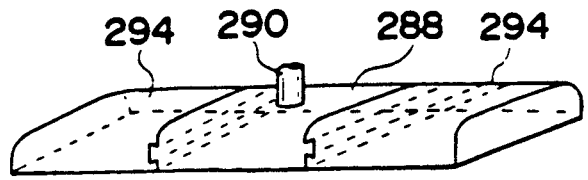
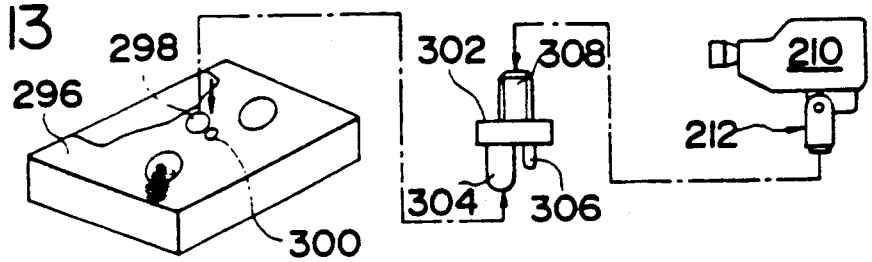
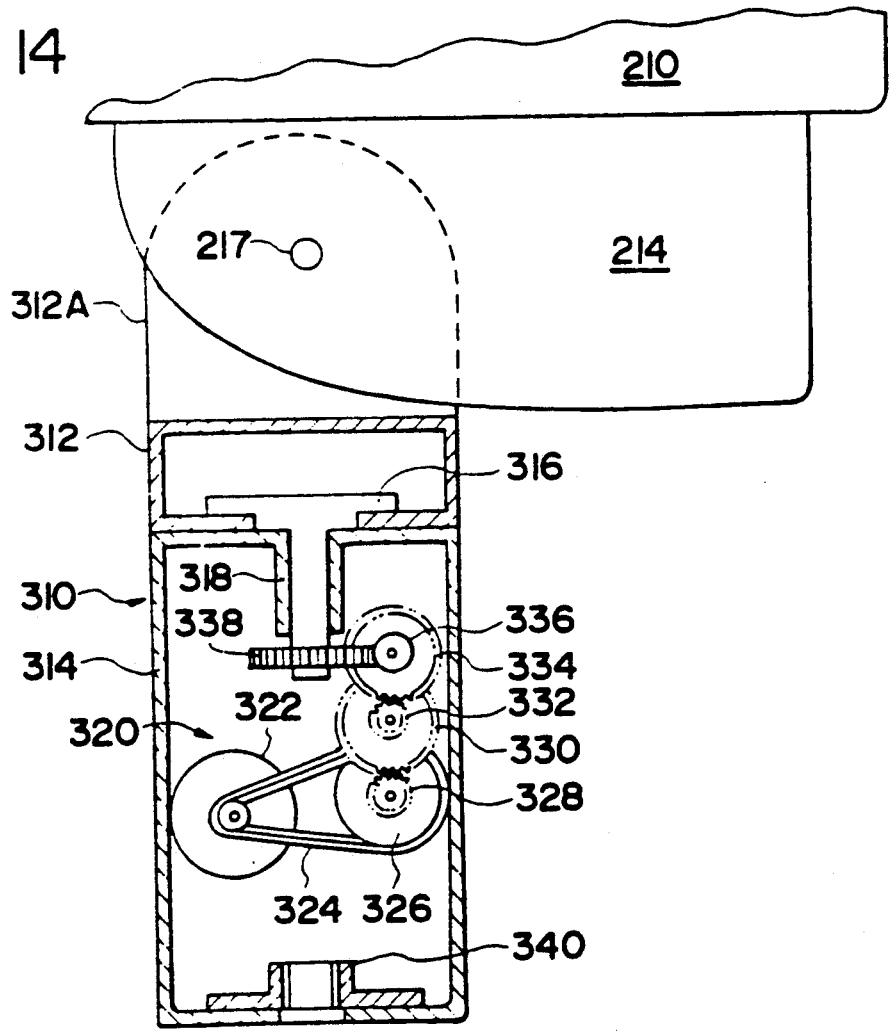

VIDEO CAMERA

This a continuation of application Ser. No. 07/326,833 filed Mar. 21, 1989.

BACKGROUND OF THE INVENTION

1. Field of the Invention

The present invention relates to a video camera and, in particular, to a video camera which is provided with a drive device for swinging or tilting the video camera.

2. Description of the Related Art

Conventionally, in order to swing or tilt a video camera automatically, an electric pan head device is put on a tripod, the video camera is fixed onto the electric pan head device, and an operation button, which is arranged in the electric pan head device, is operated.

Also, there is known a video camera of a type that is equipped with a grip in the lower portion of a main body thereof and, in order to automatically swing or tilt this type of video camera, the grip must be removed from the video camera or must be folded, and after then the video camera is fixed onto an electric pan head device as in the above-mentioned case, before it can be swung or tilted.

However, in the above-mentioned prior art video cameras, due to the fact that an electric pan head device, a tripod, batteries and other accessories must be carried, they are bulky when they are carried.

SUMMARY OF THE INVENTION

The present invention aims at eliminating the drawbacks found in the above-mentioned prior art video cameras.

Accordingly, it is an object of the invention to provide a video camera which eliminates the need to carry separately an electric pan head device for swinging or tilting the video camera, is convenient to carry, and is capable of automatic swinging or tilting.

In order to achieve the above object, according to the invention, there is provided a video camera which includes in a main body thereof a drive device for swinging or tilting the video camera. Also, according to the invention, in a video camera which includes a grip in the lower portion of a main body thereof, a drive device for swinging or tilting the video camera is included in the grip.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 6 is a side view of the video camera shown in FIG. 4 when it is mounted onto a tripod;

FIG. 7 is a perspective view of the video camera shown in FIG. 4, illustrating when the video camera is placed on a floor or the like and is then swung;

FIGS. 8(A) and (B) are respectively perspective views of a mounting disc plate employed in the swing operation in FIG. 7;

FIG. 9 is a side view of main portions of a fourth embodiment of a video camera according to the invention, particularly illustrating when the video camera is placed on a floor or the like and is then swung;

FIG. 10 is a side view of the video camera shown in FIG. 4, illustrating when the video camera is mounted to a battery case;

FIGS. 11(A) and (B) are respectively perspective views of the battery case used in FIG. 10;

FIGS. 12(A) and (B) are respectively perspective views of a battery on which a video camera according to the invention is set up;

FIG. 13 is an explanatory view of the video camera shown in FIG. 4, illustrating how the video camera is connected via an adapter to a tape cassette;

FIG. 14 is a section view of main portions of a fifth embodiment of a video camera according to the invention;

DETAILED DESCRIPTION OF THE INVENTION

Detailed description will hereunder be given of the preferred embodiments of a video camera according to the present invention with reference to the accompanying drawings.

Figure 1:
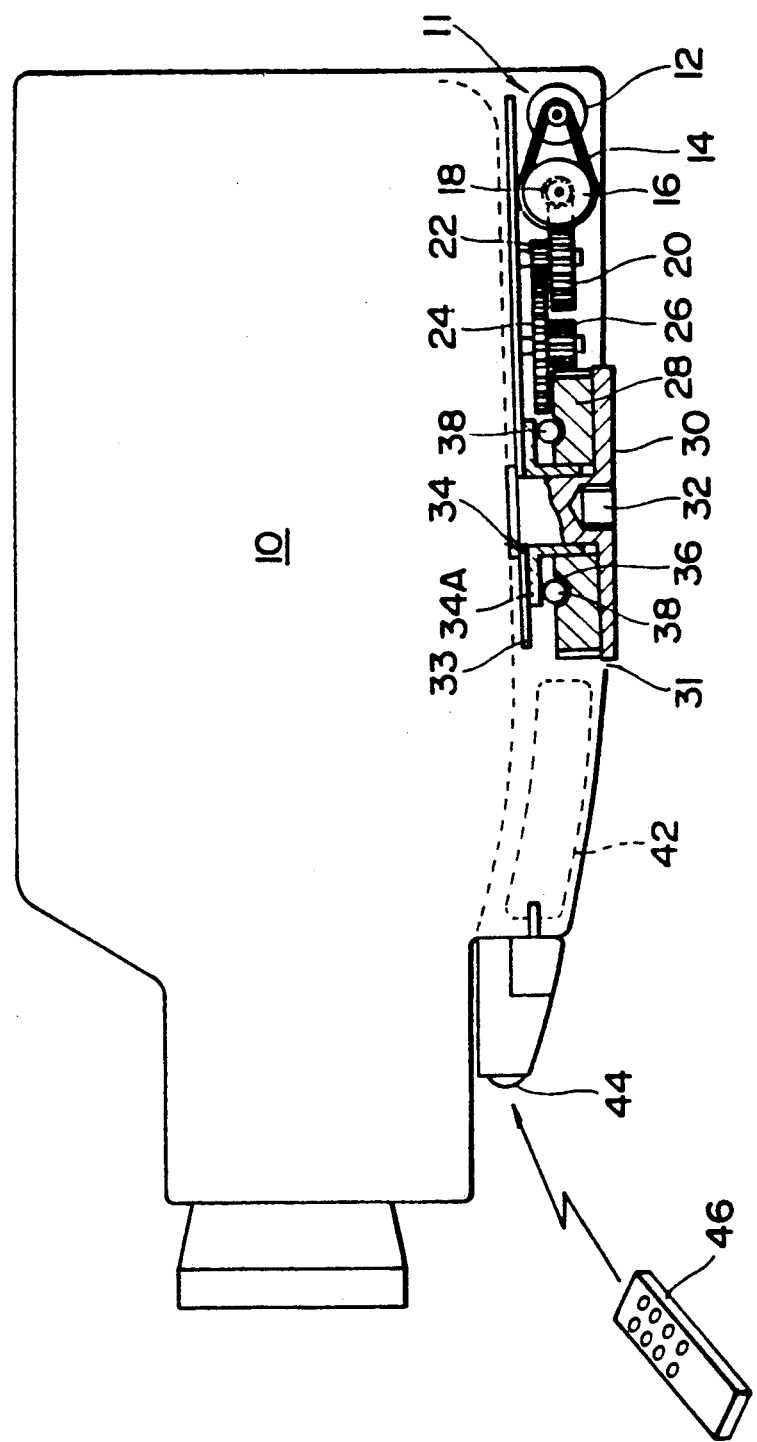
FIG. 1 is a side view of a video camera according to the invention, with the main portions thereof in cross section.

Referring first to FIG. 1, there is shown a side view of a video camera according to the invention, including a section view of the main portions of the video camera As shown in FIG. 1, the video camera has a main body 10 which includes a swing device 11 in the lower portion thereof. The rotational movements of a drive motor 12 in the swing device 11 are transmitted through a transmission belt 14 to a pulley 16, and the rotational movements of the pulley 16 are in turn transmitted through a worm 18, which is coaxial with the pulley 16, to gears 20, 22, 24, 26, and are then transmitted to a large-size ring gear 28 which intermeshes with the gear 26. To the large ring gear 28, there is fixed an adapter 30 which can be loosely fitted into an opening 31 formed in the lower surface of the video camera main body 10. In the central portion of a lower surface of the adapter 30, there is formed a mounting hole 32 into which a mounting screw, provided in a tripod or the like, is threadedly inserted and fixed there.

The video camera main body 10 includes a frame 33 to which there is fixedly secured a mounting metal member 34. Also, the adapter 30 has a shaft. The shaft of the adapter 30 can be inserted into the mounting metal member 34 in such a manner that it can be rotated. Further, in the upper surface of the large-size ring gear 28, there is formed a recessed portion 36 in which steel balls 38, 38, —can be stored. The mounting metal member 34 has a flange 34A which is in contact with the upper surface of the steel ball 38. These steel balls 38, 38, —support the mounting metal member 34 and video camera main body 10 in such a manner that they can be rotated.

In addition, in the lower portion of the video camera main body 10 there is stored a control circuit 42 for the drive motor 12. The control circuit 42 is adapted to control the drive motor 12 in accordance with an input signal from an infra-red rays receiving sensor 44 which is provided in the front surface of the video camera main body 10. On the other hand, there is provided a remote control device 46 which can be operated by an operation button to output a given infra-red rays signal to the infra-red rays receiving sensor 44 and the infra-red rays receiving sensor 44 in turn outputs the above-mentioned signal to the control circuit 42 in accordance with the infra-red rays signal from the remote control device 46.

According to the video camera constructed in the above-mentioned manner, the main body 10 of the video camera is set up directly on the tripod by means of the adapter 30. And, if, by operating the operation button for the remote control device 46, the infra-red rays signal is output to the infra-red rays receiving sensor 44, then the motor 12 of the swing device 11 can be rotatively driven in a given direction by means of the infra-red rays receiving sensor 44 and control circuit 42.

By means of the above-mentioned rotational driving, the gear 26 turns round the peripheries of the large-size ring gear 28 and thus the video camera main body 10 is rotated about the adapter 30, that is, the swing operation of the video camera main body can be performed. Therefore, the present video camera is able to perform its swing operation without using any electric pan head device, and also the swing operation of the video camera can be remotely controlled by use of the remote control device 46. Since the swing device 11 is contained within the video camera main body 10 and is able to move integrally with the main body 10, the swing device 11 can be connected simply to the power supply source of the main body 10 and is easy to use. This eliminates the need to carry one or more batteries for the electric pan head device and thus the number of batteries to carry can be reduced accordingly.

Figure 2:
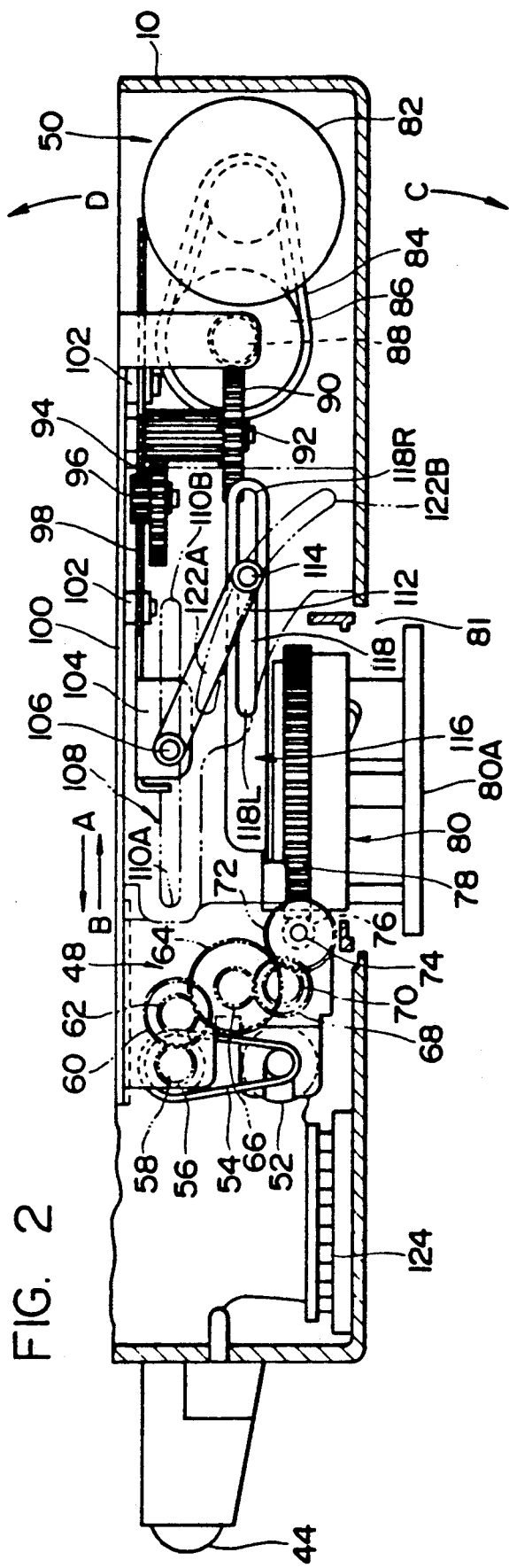
FIG. 2 is a section view of main portions of a second embodiment of a video camera according to the invention.

Now, referring to FIG. 2, there is shown a section view of main portions of a second embodiment of a video camera according to the invention. As shown in FIG. 2, in the lower portion of the video camera main body 10, there are contained a swing device 48 and a tilt device 50.

The swing device 48 has a drive motor 52 which transmits its rotational movements to a pulley 56 through a belt 54. The rotational movements of the pulley 56 are in turn transmitted through gears 58, 60, 62, 64, 66, 68, 70, 72 to a worm 76. There is provided a support shaft 74 which is coaxial with the worm 76 and has two ends respectively disposed in the video camera main body 10. The worm 76 is adapted to mesh with a ring gear 78 which is fixedly secured to the outer peripheral surface of a cylinder-shaped adapter 80. The adapter 80 is inserted into an opening 81 formed in the bottom surface of the video camera main body 10, and the adapter 80 also has a lower portion 80A in which a tripod or the like can be fixed. Therefore, if the drive motor 52 is rotated, then the worm 76 of the support shaft 74 can be rotated and, due to the rotation thereof, the worm 76 can move along the peripheries of the adapter 80. As a result of this, the video camera main body 10 supporting the support shaft 74 can be rotated about the adapter 80, that is, the swing operation of the main body 10 can be performed.

The tilt device 50 has a drive motor 82 and the rotational movements of the drive motor 82 are transmitted through a belt 84 to a pulley 86. A worm 88, which is arranged coaxially with the pulley 86, is intermeshable with a gear 90. A small-size gear 92, which is arranged coaxially with the gear 90, is in mesh with a gear 94 and another small-size gear 96 coaxial with the gear 94 is in mesh with a rack 98. In the main body 10 of the video camera there is provided a support frame 100 to which two holding metal members 102, 102 are mounted. And, the above-mentioned rack 98 is supported by the two holding metal members 102, 102 and can be moved in the direction of an arrow A or in the direction of an arrow B (shown in FIG. 2) by means of the rotational movements of the above-mentioned small-size gear 96.

Figure 3:
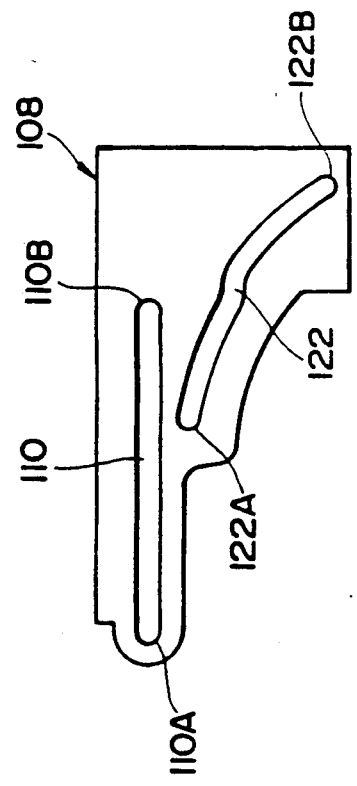
FIG. 3 is a plan view of a triangle plate used in the video camera shown in FIG. 2.

To the rack 98, there is mounted through a mounting plate 104 a moving shaft 106 which, as shown in FIG. 3, can be inserted into an elongated bore 110 formed in a side plate 108 (in FIG. 2, it is shown by an imaginary line). The side plate 108, as shown by the imaginary line in FIG. 2, is fixed to the bottom surface of the video camera main body 10 and the support frame 100 provided within the main body 10.

A driven shaft 114 is mounted through a link member 112 to the moving shaft 106. The driven shaft 114 is inserted into an elongated bore 118 formed in a tilt chassis 116 and also can be moved within the elongated or guide bore 118 together with the moving shaft 106. Here, the tilt chassis 116 is supported by the support shaft 74 provided on the side of the video camera main body 10 in such a manner that it can be inclined, and also the tilt chassis 116 has a lower surface to which the adapter 80 is fixed. And, the driven shaft 114 is also inserted into a curved bore 122 formed in a side plate 108.

Due to the above-mentioned structure, when the moving shaft 106 mounted to the rack 98 is moved in the direction of the arrow A to be situated in the left end portion 110A of the elongated bore 110, then the driven shaft 114 is moved the left end portion 118L of the guide bore 118. Also, the side plate 108 is moved such that the end portion 122A of the curved bore 122 in the side plate 108 can be superposed on the left end portion 118L of the guide bore 118. As a result of this, the whole video camera main body 10 supporting the side plate 108 is rotated about the above-mentioned support shaft 74 in the direction of an arrow C shown in FIG. 2.

On the other hand, if the moving shaft 106 is moved in the direction of the arrow B due to the movements of the rack 98, then the driven shaft 114 is situated in the right end portion 118R of the guide bore 118 and the side plate 108 is moved such that the end portion 122B of the curved bore 122 in the side plate 108 is situated in the guide bore right end portion 118R. This causes the video camera main body 10 to rotate about the support shaft 74 in the direction of an arrow D shown in FIG. 2.

As a result of this, by means of the rotational movements of the drive motor 82 in the tilt device 50, the video camera main body 10 is rotated about the support shaft 74 in the direction of the arrow C or D.

Also, for control of the swing device 48 and tilt device 50, as in the first embodiment shown in FIG. 1, there is stored in the lower portion of the video camera main body 10 a control circuit 124 which is adapted to control the drive motor 52 for the swing device 48 and the drive motor 82 for the tilt device 50. The control circuit 124, in particular, controls the respective drive motors 52 and 82 in accordance with the input signals from the infra-red rays receiving sensor 44 that is provided on the front surface of the video camera main body 10. Also, the infra-red rays receiving sensor 44, as in the video camera shown in FIG. 1, receives an infrared rays signal sent out from the remote control device 46.

In the video camera according to the invention constructed in the last mentioned manner, the swing operation of the video camera can be performed by use of the remote control device 46 as well as the tilt operation of the video camera can be achieved by use of the tilt device 50.

Figure 4A:
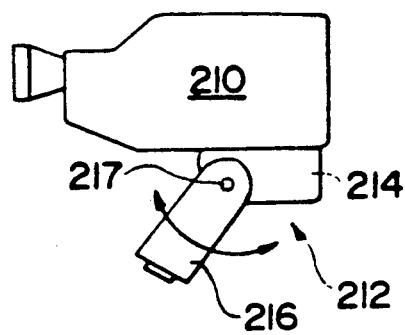
FIGS. 4(A) and (B) are respectively side views of a third embodiment of a video camera according to the invention.
Figure 4B:
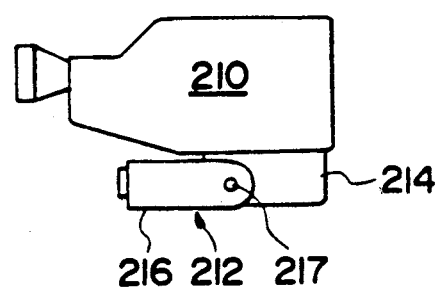

Referring now to FIGS. 4(A) and (B), there is shown a side view of a third embodiment of a video camera according to the invention. As shown in FIG. 4, the video camera has a main body 210. The main body 210 has a lower surface onto which a grip 212 is mounted. The grip 212 includes a mount base 214 and a grip portion 216. The grip portion 216 is rotatably mounted to a shaft 217 of the mount base 214. In particular, when the video camera is in operation, the grip portion 214, as shown in FIG. 4(A), is disposed such that it is inclined forwardly to a slight degree and, on the other hand, when the video camera is in storage, as shown in FIG. 4(B), the grip portion 216 is disposed such that it extends along the lower surface of the video camera main body 10.

Figure 5:
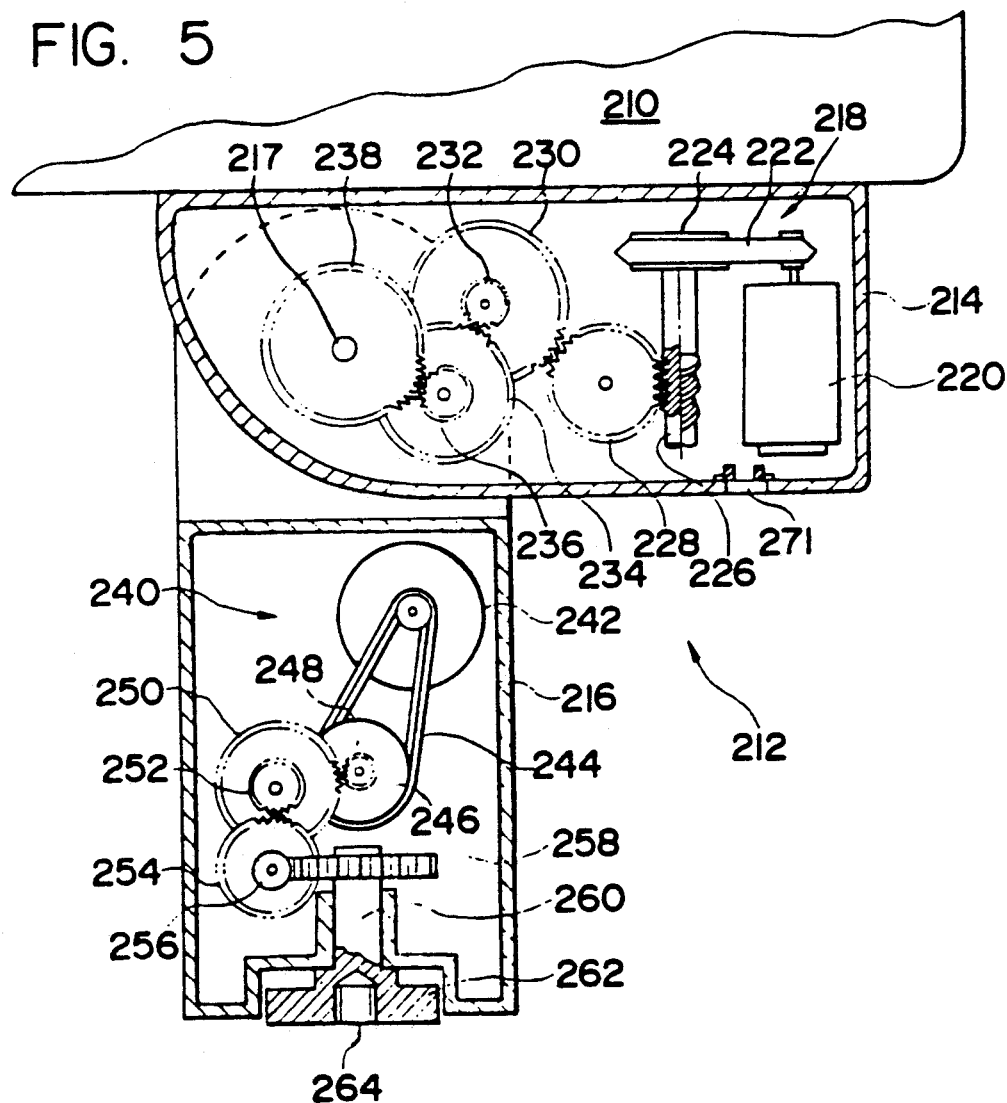
FIG. 5 is a section view of main portions of the video camera shown in FIG. 4.

As shown in FIG. 5, the mount base 214 is formed of a casing in which there is provided a tilt device 218 adapted to perform the tilt operation of the video camera main body 210. There is provided a drive motor 220 for the tilt device 218 and the rotational movements of the drive motor 220 can be transmitted through a belt 222 to a pulley 224. The rotational movements of the pulley 224 are in turn transmitted through a worm 226, a gear 228, a gear 230, a small-size gear 232, a gear 234, another small-size gear 236 to a gear 238 which is fixedly secured to a shaft 217. Also, when the grip portion 216 is set substantially at right angles with respect to the video camera main body 210 (the state of the grip portion 216 shown in FIG. 5), then the grip portion 216 is supported by the shaft 217 such that it is prevented against rotation. Because of this, if the grip portion 216 is fixed and the motor 220 is driven, then the mount base 214 and the video camera main body 210 are rotated about the shaft 217, respectively. The rotation of the motor 220 and the direction of the rotation thereof can be controlled by a control switch which is not shown.

The grip portion 216 is formed such that its interiors are hollow and within the interiors thereof there is disposed a swing device 240. A drive motor 242 for the swing device 240 rotationally drives a pulley 246 through a transmission belt 244. The rotational movements of the pulley 246 are transmitted to a gear 248, a gear 250, a small-size gear 252, and gear 254. A worm 256 coaxial with the gear 254 meshes with a gear 258 which is fixedly secured to a shaft of rotation 260, and the rotational shaft 260 is rotatably mounted to an opening 262 formed in the bottom surface of the grip portion 216. In the bottom surface of the rotational shaft 260, there is formed a mount bore 264 with which a fixing screw in a tripod or the like can be threadedly engaged. Due to such structure, the rotational shaft 260 can be fixed by the fixing screw in the tripod or the like and, if the drive motor 242 for the swing device 240 is driven, then the worm 256 is rotated to thereby rotate the grip portion 216 about the rotational shaft 260. As a result of this, the mount base 214 and the video camera main body 210 are rotated. Here, the rotation of the drive motor 242 for the swing device 240 as well as the direction of the rotation thereof can be controlled by a control switch which is not shown.

According to the video camera constructed in the above-mentioned manner, in photographing, as shown in FIG. 4(A), the grip portion 216 is operated in such a manner that it is inclined forwardly at a given angle with respect to the camera main body 210. Also, in storage, as shown in FIG. 4(B), the grip portion 216 is made to extend along the video camera main body 210.

Next, when swinging or tilting the video camera, as shown in FIG. 6, with the grip portion 216 being set in a vertical direction, the video camera is fixedly secured to a tripod 266 through the rotational shaft 260 of the grip portion 216. In this state, the main body 210 of the video camera can be swung by the swing device 240 in the grip portion 216, or can be tilted by the tilt device 218 in the mount base 214.

In other words, according to the invention, the video camera can be mounted directly to the tripod 266 through the grip portion 216 so that it can be swung or tilted, which eliminate the need to carry an electric pan head device as in the prior art video cameras. Also, since the swing device 240 and the tilt device 218 are contained within the grip 212, the video camera main body 210 and grip 212 are equal in volume to those in the prior art video cameras.

Referring next to FIG. 7, there is shown a perspective view of a video camera according to the invention, illustrating a state when it is placed on a floor or the like to be swung. As shown in FIG. 7, the grip portion 216 of the video camera main body 210 is rotated to the storage state thereof, and a disc plate 268, which is shown in FIG. 8(A), is mounted to the rotational shaft 260 of the grip portion 216. The disc plate 268 is formed to have a greater diameter than that of the grip portion 268, and it is also provided in the central portion thereof with a mount screw 270 similar to the tripod 266. On the other hand, as shown in FIG. 5, in the lower surface of the mount base 212, there is formed a mount hole 271 to which a double disc plate 272, which is shown in FIG. 8(B), is to be mounted. The double disc plate 272 is composed of two disc members 276, 278, and the disc member 276 is provided in the central portion thereof with a mount screw 274. Also, the disc member 278 is mounted such that it is free to rotate with respect to the disc member 276.

In a case when the disc plate 268 and the double disc plate 272 are mounted in the above-mentioned manner, if the drive motor 242 of the swing device 240 is driven, then the worm 256 is rotated through the respective gears shown in FIG. 5. In this case, the worm 256 turns the gear 258 to thereby rotate the rotational shaft 260 while the grip portion 216 is prevented against rotation. And, the disc plate 268 of the rotational shaft 260 rolls on the floor and the video camera main body 210 is rotated about the mount screw 274 of the double disc plate 272, that is, the video camera main body 210 can be swung. Therefore, when the video camera is used by placing it on a horizontal place such as a floor, shelf and the like, the video camera can be swung without requiring a tripod.

Also, in the above-mentioned embodiment, the double disc plate 272 is mounted to the mount base 214. However, this is not limitative, but, as shown in FIG. 9, there may be provided an acute-angle projection 279 in the lower portion of the mount base 214 and the video camera main body 210 may be swung about the projection 279.

Now, referring to FIG. 10, there is shown a side view of the above-mentioned third embodiment of a video camera according to the invention, when it is mounted to a battery case. As shown in FIGS. 11(A) and (B), the battery case 280 is a foldable type and two or more batteries 282 can be stored within the battery case 280. There is provided a rotational shaft portion 284 which is used to fold the battery case 280. Substantially in the central portion of the rotational shaft portion 284, there is provided a mount screw 286 which is used to mount the video camera.

With use of the battery case 280 constructed in the above-mentioned manner, the video camera according to the invention can be fixed to the mount screw 286 of the battery case 280 by means of the mount hole 264 formed in the bottom surface of the grip portion 216. Due to this, by using the battery case 280, which is being carried, as a pedestal (a tripod), the video camera can be tilted or swung without using a tripod.

Referring now to FIGS. 12(A) and (B), there is shown a perspective view of a battery which is used in a video camera. As shown in FIG. 12, the battery, which is designated by 288, is provided in the upper surface thereof with a mount screw 290 and is also provided in the side surfaces thereof with projected portions 292, 292 which are respectively used for engagement with other batteries 294, 294. On the other hand, the batteries 294, 294 are formed with groove-shaped portions in the respective side surfaces thereof.

According the above-mentioned batteries 288, 294, as shown in FIG. 12(B), a pedestal can be formed by combining the batteries 288, 294, 294 with one another. The video camera according to the invention can be installed on the thus formed pedestal by means of the mount screw 290 so that it can be tilted or swung. Therefore, if a horizontal place is available, the present video camera can be tilted or swung in an easy manner without carrying a tripod or the like.

Next, referring to FIG. 13, there is shown an explanatory view to illustrate how the present video camera is installed to a tape cassette. As shown in FIG. 13, in the upper surface of a case 296 for a video tape, there are formed holes 298, 300 which are respectively used to detect an end tape. On the other hand, an adapter 302 is provided on the lower surface thereof with downwardly projecting pins 304, 306 which can be fitted into the holes 298, 300, in the case 296, respectively and the adapter 302 is also provided on the upper surface thereof with a mount screw 308 for mounting the video camera.

According to the thus formed adapter 302, the mount screw 308 of the adapter 302 is inserted into the mount hole 264 in the grip 212 of the video camera according to the invention, while the pins 304, 306 are inserted into the holes 298, 300 in the case 296, respectively. As a result of this, the present video camera can be fixed to the cassette case 296 and the cassette case 296 can be used as a pedestal for swinging or tilting of the video camera.

Referring now to FIG. 14, there is shown a side sectional view of a fifth embodiment of a video camera according to the invention, illustrating a modification of the grip shown in FIG. 4. As shown in FIG. 14, a mount base 214 of the grip is mounted to the video camera main body 210 similarly as in the video camera shown in FIG. 4. Also, the interior structure of the mount base 214 is substantially similar to that of the video camera shown in FIG. 4 and thus the detailed description thereof is omitted here.

The illustrated grip includes a grip portion 310 which is divided into two members, that is, the grip portion 310 is composed of an upper member 312 and a lower member 314. The upper member 312 has a mount plate 312A and the mount plate 312A is pivotally supported by a shaft in such a manner that it holds the mount base 214 therebetween. The upper member 312 also has a lower surface to which a connecting shaft 316 is fixed. The connecting shaft 316 can be rotatably inserted into a mount hole 318 formed in the upper surface of the lower member 314. The lower member 314 is formed of a casing within which there is disposed a swing device 320. There is provided a drive motor 322 for the swing device 320 and the rotational movements of the drive motor 322 are transmitted through a transmission belt 324, a pulley 326 and gears 328, 330, 332, 334 to a worm 336. The worm 336 is adapted to mesh with a gear 338 mounted to the lower end of the connecting shaft 316 and thus the connecting shaft 316 can be rotated by means of rotation of the worm 336. Also, the lower member 314 has a lower surface in which a mount hole 340 is formed, and the mount hole 340 is threadedly engageable with a mount screw provided in a tripod or the like, whereby the grip portion 310 can be fixedly secured onto the tripod.

In the video camera constructed in the above-mentioned manner according to the invention, the grip portion 310 of the grip can be fixed to the mount screw of the tripod or the like by means of the mount hole 217. In order to swing the video camera, the drive motor 322 for the swing device 320 can be rotationally driven to thereby rotate the connecting shaft 316. The rotational movements of the connecting shaft 316 cause the upper member 322 and mount base 212 to rotate and thus the main body 210 of the video camera is rotated, so that the swing operation of the video camera can be performed.

Figure 15:
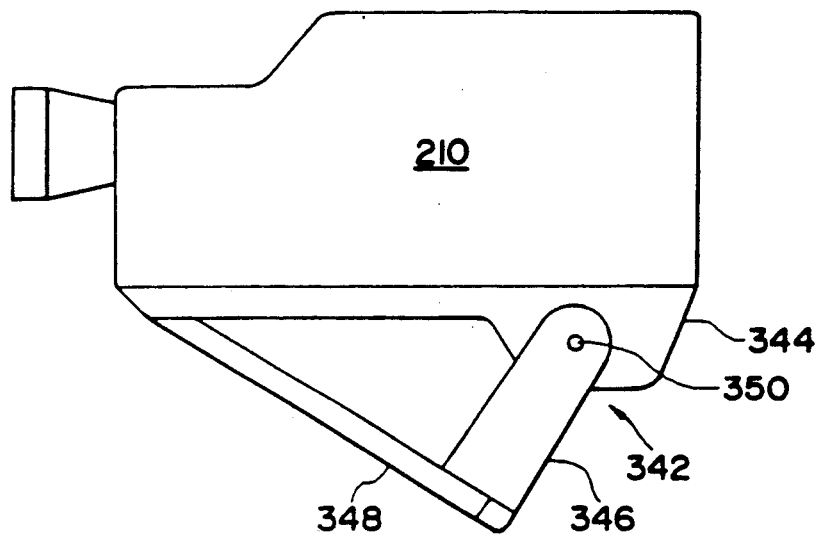
FIG. 15 is a side view of a sixth embodiment of a video camera according to the invention.
Figure 16:
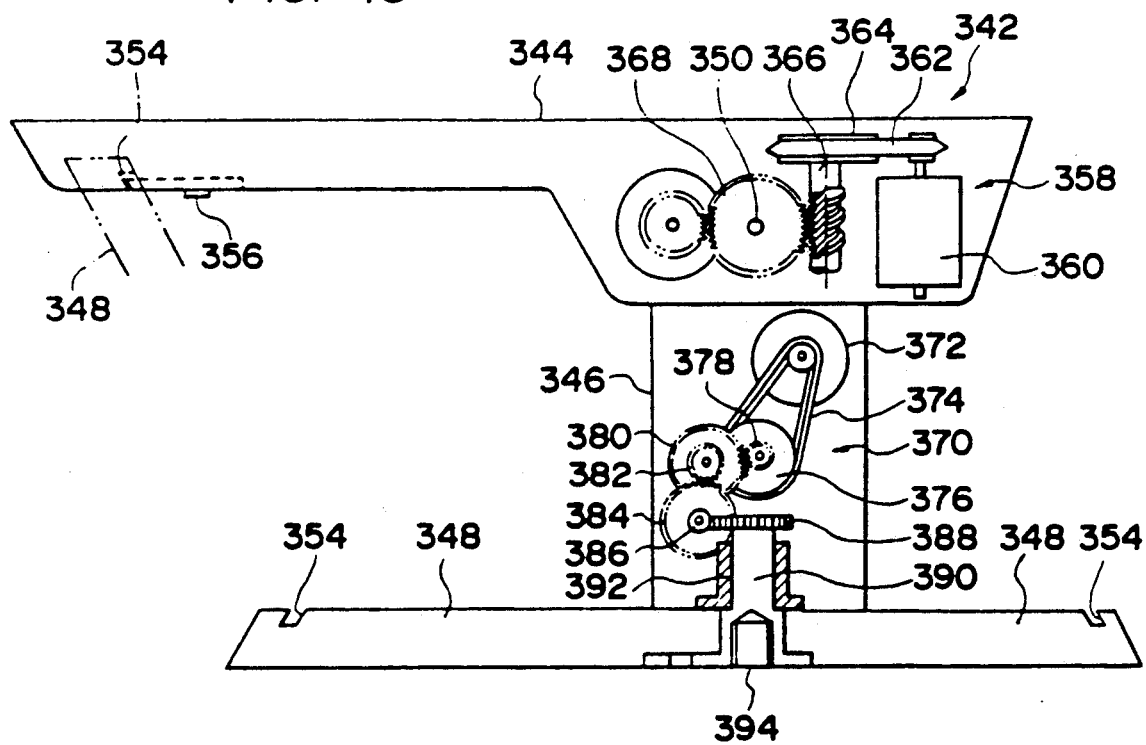
FIG. 16 is an explanatory view of the interior portions of a grip shown in FIG. 15.

Referring now to FIG. 15, there is shown a side view of a sixth embodiment of a video camera according to the invention. As shown in FIGS. 15 and 16, a grip 342 is mounted to the lower surface of the main body 210 of the present video camera. The grip 342 is composed of a mount base 344 which is fixed to the lower surface of the grip, a grip portion 346, and connecting members 348, 348, 348 which are respectively mounted to the lower surface of the grip portion 346. This grip 342 is used as a handle when carrying the video camera.

Figure 17:
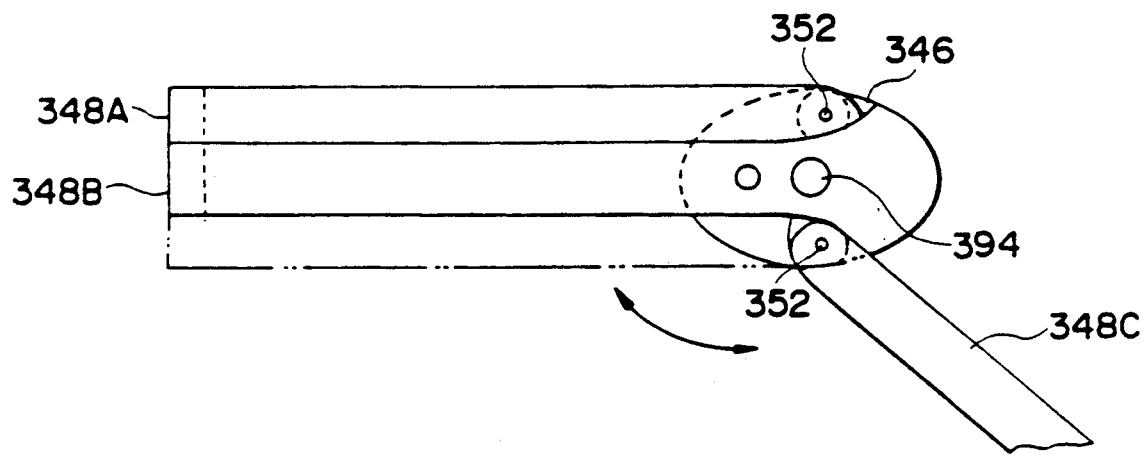
FIG. 17 is a bottom view of the grip shown in FIG. 15.
Figure 18:
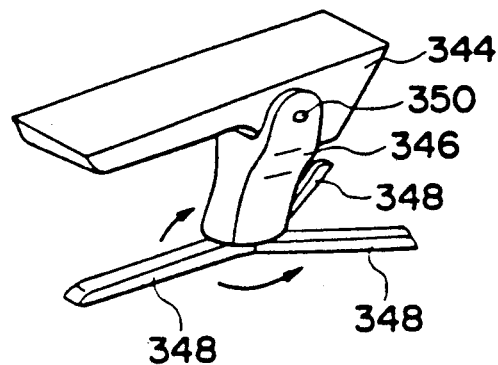
FIG. 18 is a perspective view of a grip portion shown in FIG. 15.

The grip portion 346 is arranged such that it can be rotated about a shaft 350. As shown in FIG. 17, out of the connecting members 348A, 348B, 348C on the lower surface of the grip portion 346, the two connecting members 348A and 348C, which are respectively situated at the outsides of the grip portion 356, can be rotated substantially up to an angle of 120° via pins 352, 352, respectively. Also, as shown in FIG. 16, in the leading end portion of the connecting member 348, there is formed an engagement groove 354. On the other hand, on the lower surface of the mount base 344, there is provided a slidable stop member 356. When carrying the video camera, the stop member 356 is inserted into the engagement groove 354 in the connecting member 348 and thus, as shown in FIG. 15, the connecting member 358 can be fixedly secured to the mount base 344.

The mount base 344 is formed hollow and it includes therein a tilt device 358 and a drive motor 360 for the tilt device 358. The rotational movements of the drive motor 360 can be transmitted through a transmission belt 362 and a pulley 364 to a worm 366. The worm 366 is adapted to mesh with a gear 368 which is fixedly secured to the shaft 350. Also, the grip portion 346 is secured to and held by the rotary shaft 350 such that it is prevented against rotation, when the grip portion 346 is set substantially at right angles with respect to the mount base 344. Therefore, if the drive motor 360 is rotated, then the worm 366 is rotated so that the mount base 344 can be rotated about the shaft 350.

The grip portion 346 is formed of a casing in which there is disposed a swing device 370 having a drive motor 372. The rotational movements of the drive motor 372 of the swing device 370 can be transmitted through a transmission belt 374, a pulley 376, and gears 378, 380, 382, 384, to a worm 386. The worm 386 is arranged so as to mesh with a gear 388 which is secured to a shaft of rotation 390. The rotary shaft 390 is arranged such that it is inserted into an opening 392 formed in the bottom surface of the grip portion 346 also is fixedly secured to the connecting member 348B which is located centrally of the grip portion 346. Also, on the bottom surface of the rotary shaft 390, there is formed a mount hole 394 into which a mount screw in a tripod can be threadedly engaged. Due to such construction, the present video camera can be fixed to the tripod by means of the mount hole 394.

According to the video camera of the invention constructed in the above-mentioned manner, in photographing, as shown in FIG. 15, with the leading end portion of the connecting member 348 being engaged against the mount base 344, the video camera can be operated. Also, in this condition, the video camera can be carried with ease by means of the grip 342.

When the swinging or tilting operation of the video camera is performed, the grip portion 346 is disposed at right angles with respect to the video camera main body 210 and the connecting members 348, 348, 348 are rotated into a wide-open state so that they can be used as a tripod. In this state, if the drive motor 360 of the tilt device 358 is rotated, then the mount base 344 is rotated about the shaft 350 and thus the video camera main body 210 can be tilted together with the rotation of the mount base 344. Also, if the motor 372 of the swing device 370 is rotated, then the worm 386 is rotated through the transmission gear and the like and the grip portion 346 can be rotated about the rotary shaft 390 by means of the rotational movements of the worm 386. This rotational movement of the grip portion 346 causes the video camera main body 210 to rotate, that is, the swing operation of the video camera can be achieved.

Figure 19:
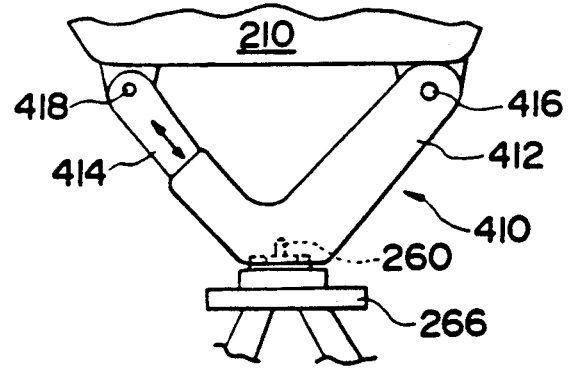
FIG. 19 is a side view of main portions of a seventh embodiment of a video camera according to the invention.

Referring now to FIG. 19, there is shown a side view of main portions of a seventh embodiment of a video camera according to the invention. As shown in FIG. 19, a grip 410 is composed of an L-shaped grip portion 412 and an expansion rod 414. The upper end section of the grip portion 412 is rotatably mounted to the main body of the video camera 210 by means of a shaft 416. Also, the other end of the grip portion 412 is formed in the form of a cylinder for the expansion rod 414, that is, the expansion rod 414 can be slidably inserted into the other end section of the grip portion 412. The expansion rod 414 can be driven by a cylinder drive mechanism which is provided within the grip portion 412.

Also, on the bottom surface of the grip portion 412, there is provided the rotary shaft 260 of the grip that is used in the video camera shown in FIG. 4 and, within the grip portion 412, there is disposed the swing device 220. And, by bringing the mount screw of the tripod 266 into threaded engagement with the mount hole 264 in the rotary shaft 260, the video camera can be fixed onto the tripod.

According to the video camera of the invention constructed in the above-mentioned manner, the swing operation of the video camera can be performed by the swing device 220 in the grip portion 412 and the tilting operation of the video camera can be achieved by the rotational movements of the video camera main body 210 about the shaft 416 due to the expansion and contraction of the expansion rod 414. Therefore, in this case as well, the grip 410 is equipped therein with the swing and tilt devices.

Figure 20:
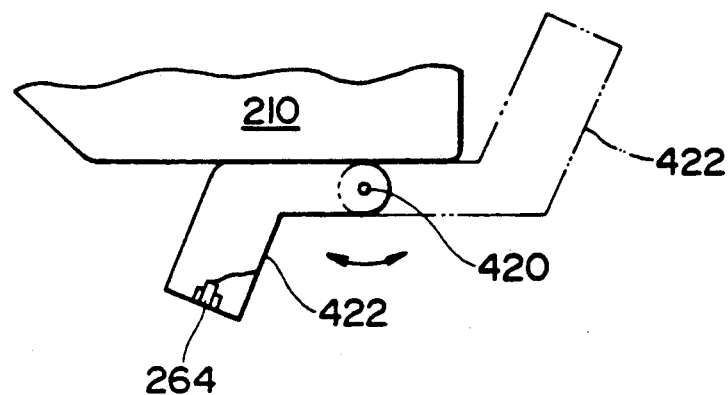
FIG. 20 is a side view of main portions of an eighth embodiment of a video camera according to the invention; and, FIG. 21 is a side view of the video camera shown in FIG. 20, illustrating how the video camera is tilted.

Referring next to FIG. 20, there is shown a side view of main portions of an eighth embodiment of a video camera according to the invention. As shown in FIG. 20, on the lower surface of the video camera main body 210, there is rotatably mounted a grip 422 which is formed in a curved shaped about a shaft 440. The grip 422 can be rotated up to a position which is shown by an imaginary line in FIG. 20.

Figure 21:
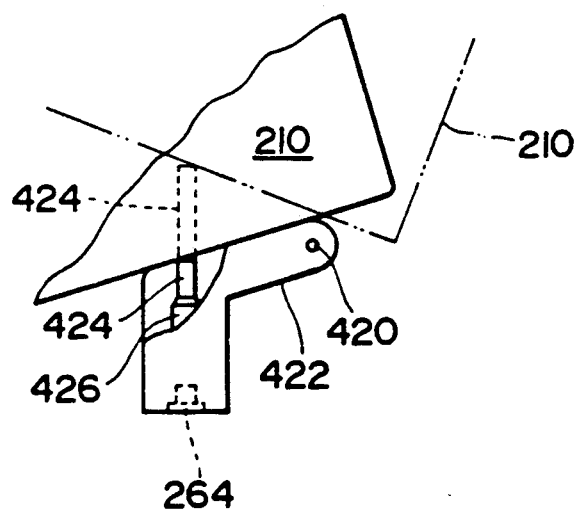

Within the grip 422, there is arranged the swing device that is shown in FIG. 5 and, on the lower surface of the grip 422, there is provided the rotary shaft 264. Also, as shown in FIG. 21, within the grip 422 there are also provided an expansion rod 424 and a cylinder 426. The expansion rod 424 can be projected and retreated from the upper surface of the grip 422 by the cylinder 426, so that, as shown by an imaginary line in FIG. 21, the expansion rod 424 can push up the video camera main body 210 and thereby rotate the main body 210 about a shaft 420.

According to the video camera of the invention constructed in the above-mentioned manner, by projecting or retreating the expansion rod 424 of the grip 422, the video camera main body 210 can be tilted and also the video camera can be swung by use of the swing device 240 that is disposed within the grip 422. Also, conventionally, the grip 422 provides an obstacle when it is located on the lower surface of the video camera main body 210, but, however, according to the video camera of the invention, by rotatively moving the grip 422 to the position shown by the imaginary line in FIG. 20, the grip 422 can be used as a handle when carrying and at the same time the grip 422 provides no obstacle at all.

In the above-mentioned embodiments, both of the swing and tilt devices are disposed within the grip. However, this is not limitative, but only one of the swing and tilt devices may be provided within the grip.

It should be understood, however, that there is no intention to limit the invention to the specific forms disclosed, but on the contrary, the invention is to cover all modifications alternate constructions and equivalents falling within the spirit and scope of the invention as expressed in the appended claims.

What is claimed is:

1. A video camera comprising a drive device within a main body of the video camera capable of at least swinging or tilting the video camera main body, wherein said drive device comprises a tripod mounting member to be screwed to a tripod, a ring gear fixed to said tripod mounting member, support means for supporting said tripod mounting member and ring gear in such a manner that they are free to rotate with respect to said video camera main body, and a swing drive part for rotating said ring gear.

2. A video camera comprising a drive device within a main body of the video camera capable of at least swinging or tilting the video camera main body, wherein said drive device comprises a tripod mounting member to be screwed to a tripod, a tilt chassis for supporting said tripod mounting member, a support shaft for supporting said tilt chassis in such a manner that it is free to incline with respect to said video camera main body, and a tilt drive part for rotating said tilt chassis about said support shaft to incline said tilt chassis with respect to said video camera main body.

3. A video camera including within a main body of the video camera a drive device capable of at least swinging or titling the video camera main body, wherein said drive device comprises a tripod mounting member to be screwed to a tripod, a ring gear fixed to said tripod mounting member, a tilt chassis for supporting said tripod mounting member and ring gear in such a manner that they are free to rotate with respect to said video camera main body, a support shaft for supporting said tilt chassis in such a manner that it is free to incline with respect to said video camera main body, a swing drive part including a worm disposed coaxially with said support shaft and meshing with said ring gear for rotating said ring gear by means of said worm, and a tilt drive part for rotating said tilt chassis about said support shaft to incline said tilt chassis with respect to said video camera main body.

4. A video camera according to claim 1, wherein said camera is adapted to receive infrared rays from a remote control device, said camera further comprising an infra-red rays receiving sensor disposed in said video camera main body for receiving infra-red rays from said remote control device and
a control circuit disposed in said video camera main body for controlling said drive device in accordance with an infra-red rays signal input to said control circuit from said infra-red rays receiving sensor.

5. In a video camera including a grip in the lower portion of a main body thereof, the improvement comprising, a drive device disposed within said grip for at least swinging or tilting said video camera main body.

6. A video camera as set forth in claim 5, wherein said grip is inclinably disposed in the lower portion of said video camera main body by means of a shaft of rotation.

7. A video camera as set forth in claim 6 wherein said drive device comprises a gear fixed to said rotary shaft of said grip and a tilt drive part for rotating said gear.

8. A video camera as set forth in claim 6, wherein said drive device comprises a cylinder interposed between said grip and said video camera main body, and said drive device rotates said video camera main body about said shaft of rotation to incline said video camera main body by extending a piston rod of said cylinder.

9. A video camera as set forth in claim 5, wherein said drive device comprises support means including a shaft of rotation, of which axial direction extends longitudinally of said grip, for supporting said grip in a freely rotatable manner, a ring gear fixed to said shaft of rotation, and a swing drive part for rotating said ring gear.

10. A video camera as set forth in claim 9, wherein said grip includes a tripod mounting member in the bottom portion thereof.

11. A video camera as set forth in claim 10, wherein said tripod mounting member is disposed integrally with said rotary shaft of said support means.

12. A video camera as set forth in claim 9, wherein said drive device comprises a gear fixed to said rotary shaft of said grip and a tilt drive part for rotating said gear.

13. A video camera as set forth in claim 9, wherein said drive device comprises a cylinder interposed between said grip and said video camera main body, and wherein said drive device inclines said video camera main body about said shaft of rotation by extending a piston rod of said cylinder.

14. In a video camera including a grip in the lower portion of a main body thereof adapted to be folded and unfolded, the improvement comprising:
a drive device disposed within said grip for at least swinging or tilting said video camera main body, wherein said grip is inclinably disposed in the lower portion of said video camera main body by means of a shaft or rotation and, wherein said video camera main body includes a swing center member on the lower surface thereof, and said drive device, in a state in which said grip is folded and said video camera main body is placed on a horizontal plane, rotatively moves said grip on said horizontal plane to thereby swing said video camera main body about said swing center member.

15. In a video camera including a grip in the lower portion of a main body thereof, the improvement comprising:
a drive device disposed within said grip for at least swinging or tilting said video camera main body, wherein said grip is inclinably disposed in the lower portion of said video camera main body by means of a shaft of rotation, and wherein said grip includes a connecting member having one end disposed in the bottom portion of said grip and the other end mountable on and removable from said video camera main body, said connecting member including a leg portion which can be openable and closable about said grip.

16. A video camera comprising:
a grip having an upper and a lower member, said upper member of said grip having a shaft of rotation and disposed inclinably in a lower portion of said video camera by means of said shaft of rotation, said upper member having an angle of inclination which is adjustable, and said lower member of said grip being disposed rotatably in a lower portion of said grip by means of a connecting shaft;
a swing drive means disposed within said lower member of said grip for rotating said upper member by means of said connecting shaft; and
a tripod mounting member disposed in a bottom portion of said lower member of said grip.

* * * * *